United States Patent [19]
Hershey et al.

[11] Patent Number: 5,532,860
[45] Date of Patent: Jul. 2, 1996

[54] SPATIAL SYNCHRONIZATION FOR OPTICAL COMMUNICATION SYSTEM

[75] Inventors: John E. Hershey, Ballston Lake, N.Y.; Nabeel A. Riza, Orlando, Fla.; Amer A. Hassan, Cary, N.C.

[73] Assignee: General Electric Company, Schenectady, N.Y.

[21] Appl. No.: 406,437

[22] Filed: Mar. 20, 1995

[51] Int. Cl.⁶ .................................. H04J 14/00
[52] U.S. Cl. .............. 359/159; 359/117; 359/136; 356/363
[58] Field of Search .................. 359/117, 128, 359/130, 136, 137, 138, 139, 159, 172, 156; 250/201.1; 356/363

[56] References Cited

U.S. PATENT DOCUMENTS

| | | | |
|---|---|---|---|
| 3,755,676 | 8/1973 | Kinsel | 359/117 |
| 4,691,312 | 9/1987 | Vlasak | 370/4 |
| 4,866,699 | 9/1989 | Brackett et al. | 370/3 |
| 5,206,923 | 4/1993 | Karlsson | 385/12 |
| 5,291,324 | 3/1994 | Hinterlong | 359/139 |
| 5,410,147 | 4/1995 | Riza et al. | 250/214 LS |
| 5,450,199 | 9/1995 | Reider | 356/363 |

FOREIGN PATENT DOCUMENTS

| | | | |
|---|---|---|---|
| 9428374 | 12/1994 | WIPO | 356/363 |

OTHER PUBLICATIONS

Hassan, Amer. A., John E. Hershey, Nabeel A. Riza. Spatial Optical CDMA. IEEE Journal, vol. 13, No. 3, Apr. 1995, pp. 609–613.

Riza, Nabeel A., John E. Hershey, Amer A. Hassan. Signaling System for Multiple-access Laser Communications and Interference Protection. Applied Optics, vol. 32, No. 11, 10 Apr. 1993, pp. 1965–1972.

*Primary Examiner*—Leslie Pascal
*Assistant Examiner*—Rafael Bacares
*Attorney, Agent, or Firm*—Donald S. Ingraham; Marvin Snyder

[57] ABSTRACT

A spatial synchronization method for an optical communications system includes the step of transmitting from a transmit aperture a pyramidal synchronizing profile so as to sequentially spatially register a user identification speckle pattern at a receive aperture. The iterative patterns in the pyramidal synchronizing profile detected by the receive array are processed and correlated with a library of respective user pyramidal synchronizing profiles so as to match and register the speckle pattern for a particular user. Registration of the user speckle pattern provides an offset value representing the spatial relation of a reference point of the user's pattern to a corresponding reference point of the receive aperture, which offset information is applied to a receive pattern processor so that the receive aperture is aligned with the transmitted speckle patterns.

12 Claims, 2 Drawing Sheets

SPATIAL SYNCHRONIZATION FOR OPTICAL COMMUNICATION SYSTEM

BACKGROUND OF THE INVENTION

The present invention relates to optical communications and more particularly to a method for optically synchronizing an optical transmitter and receiver in a communication system having multiple users.

Optical communication systems have been developed that provide fast and reliable means for passing information from a transmitter to a receiver. Adaptations to systems to provide access by multiple users include frequency division (FDMA) and time division (TDMA) multiplexing techniques. A further adaptation for multiplexing in an optical communications system is an analog of code division multiple access (CDMA) techniques used in radio frequency systems; in an optical system a light pattern having a spatial spread of dark and light patterns can be used. Such a spatial pattern of dark and light is commonly referred to as a speckle pattern, or alternatively as a mask. An optical communications system providing for transmission of such speckle patterns or masks is described in application Ser. No. 7/932,819, which is assigned to the assignee herein and incorporated herein by reference. In such a spatial CDMA type system multiple users can access the system simultaneously with optical signals having common frequencies; the respective signals are identified by distinctive spatial light patterns detected by the receiver.

A spatial CDMA type system has the potential for simultaneously handling the respective signals of numerous users provided that the system can accommodate complex speckle patterns. One important aspect of operation of such a system is spatial synchronization between the optical receiver and the optical transmitter. It is desirable that the optical communication system be able to rapidly and accurately detect and spatially align signals from respective users transmitting on the system.

SUMMARY OF THE INVENTION

A spatial synchronization method for an optical communications system includes the step of transmitting from a transmit aperture a pyramidal synchronizing profile so as to sequentially spatially register a user identification speckle pattern at a receive aperture. The iterative patterns in the pyramidal synchronizing profile detected by the receive array are processed and correlated with a library of respective user pyramidal synchronizing profiles so as to match and register the speckle pattern for a particular user. Registration of the user speckle pattern provides an offset value representing the spatial relation of a reference point of the user's pattern to a corresponding reference point of the receive aperture, which offset information is applied to a receive pattern processor so that the receive aperture is spatially aligned with the transmitted speckle patterns.

The step of transmitting a pyramidal synchronizing profile includes the steps of transmitting a user initialization iteration signal in which the transmit aperture control pixels are set to generate a known initialization speckle pattern; transmitting at least one user intermediate iteration signal in which a portion of the transmit aperture control pixels are set to generate a known intermediate speckle pattern, and transmitting a user final iteration signal in which the transmit aperture control pixels are set to generate a unique user identification speckle pattern.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
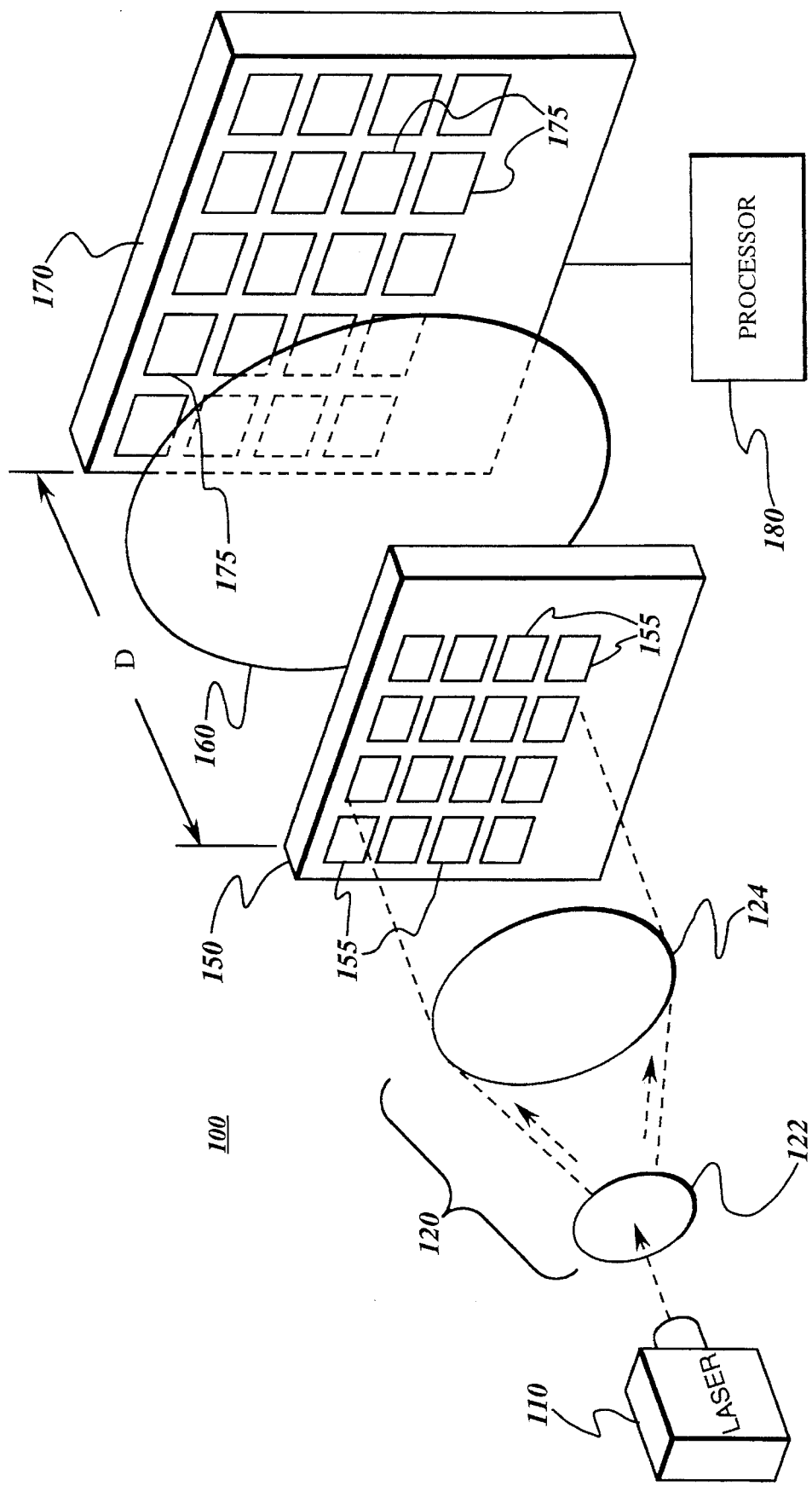
FIG. 1 is a partial schematic and partial block diagram of an optical communication system adapted for use with the spatial synchronization method of the present invention.

An optical communications system 100 comprises a source of coherent light, such as a laser 110, that is optically coupled to a transmit aperture (or optical modulator) 150 via beam forming optics 120. Beam forming optics 120 typically include a lens 122 disposed so as to receive light from laser 110 and spread the beam to be incident on a collimator 124 that provides a plurality of beams passing along substantially parallel paths to optical modulator 150. Optical communication system 100 further comprises a receive aperture (or optical detector) 170 optically coupled to transmit aperture 150 via coupling optics 160 (typically over some free space distance). Receive aperture 170 is disposed at a distance "D" from transmit aperture 150 and is disposed so as to detect the spatially encoded optical signal emanating from transmit array 150.

Transmit aperture 150 typically comprises an array of control pixels 155 which are disposed to optically modulate the light which passes therethrough. Each pixel 155 typically comprises a liquid crystal (LC) cell or the like that is disposed to selectively modulate the light passing therethrough. Control pixels 155 are disposed in an array in a predetermined pattern; by way of example and not limitation, such an array typically comprises rows and columns of pixels of a dimension $2^n \times 2^n$. Although the method of this invention is most readily implemented in arrays having rows and columns of a value that is a power of 2, other array patterns, such as circular arrays, can be used with appropriate adjustment in control settings to provide a desired pyramidal synchronization profile, which is described below with respect to an embodiment of the present invention for a $2^n \times 2^n$ transmit aperture array. Examples of the type of modulation of light passing through each pixel 155 include phase modulation (e.g., between 0 and $2\pi$ radians) (phase modulation is effectively a time delay); amplitude modulation; or alternatively, phase and amplitude modulation together. Other examples of optical modulators that may be used in control pixels 155 include films that can introduce desired phase and or amplitude shifts; individual film sheets are not programmable, and thus necessitate use of manipulating systems to positions films to create successive speckle patters.

For example, light passing from each respective control pixel 155 of transmit aperture 150 has a selected phase (that is, a phase determined by the signals applied to control pixel 155 through which the light passes) with respect to light emerging from other pixels. As the light beams passing from transmit aperture 150 propagate over the distance "D" to receive aperture 170, the beams commingle and the difference in phase of beams of light passing from respective control pixels 155 generates an interferometric optical signal at receive aperture 170. The interference pattern results in a spatial pattern of bright and dark areas; this spatial pattern and variants thereof can then be used as a basis of transmitting traffic in communications system 100.

Beam coupling optics 160 (for purposes of illustration only, shown in FIG. 1 as a circle disposed between transmit aperture 150 and receive aperture 170) are disposed to direct the light beams passing from transmit aperture 150 so that the beams are incident on receive aperture 170. The distance "D" between transmit aperture 150 and receive aperture 170 typically comprises a free space area in which the light beams passing from respective control pixels 155 converge and commingle to generate the interferometric pattern that provides the speckle pattern. Elements of beam coupling optics 160 may similarly be disposed such that free space area exists therebetween. By way of example and not limitation, such optics typically comprise lenses, reflectors, filters, beamsplitters, and the like to manipulate the path of the light beams towards the receive aperture (e.g., directing the beams at different angles as would be required with the use of multiple transmit apertures at different locations, or the deflection of beams to other components in communications system 100). Coupling optics 160 further may comprise optical fiber bundles (not shown) and associated lenslets or the like that carry the respective optical signals emanating from the control pixels of transmit aperture 150.

Receive aperture 170 comprises a plurality of optical detectors (or receive pixels) 175 disposed in an array. The pattern of the receive aperture array typically would have at least as many pixels disposed in a pattern corresponding to the pattern of pixels 155 in the transmit aperture; commonly the receive aperture array comprises a greater number of pixels 175 than is contained in the transmit aperture array. The plane of receive aperture 170 is typically disposed so that it is perpendicular to the direction of the incident light beams passing from beam coupling optics 160 so as to accurately detect the interference patterns between light emanating from respective ones of transmit aperture pixels 155. Optical detectors 175 typically comprise photodiodes, charge coupled devices, or other photodetectors that provide a sampling rate sufficient for the operation of communications system 100 (the sampling rate capacity of the receive array is primarily of consequence with respect to the transmission of traffic on the system; for purposes of spatial synchronization in accordance with this invention, sampling rate is typically not a critical issue). Each optical detector produces an electrical signal corresponding to the light incident on the detector during the sampling (or dwell) period and is then read out by a receive pattern processor 180. For example, a photodiode collects an amount of charge that is proportional to the intensity of the incident light, which charge is read out by a receive pattern processor 180. Receive pattern processor 180 typically comprises a computer or microprocessor chip that is electrically coupled to the array of photodetectors 175 and that comprises the electronic circuitry for reading out the electrical signals from optical detectors and processing those signals as discussed below.

The optical signals transmitted in optical communications system 100 are spatially encoded; that is, the signals comprise a speckle pattern (or "mask") of light and dark areas in the plane of receive aperture 170. Each user communicating on communications system 100 has a unique user identification speckle pattern that provides a basis for access and transmission of optical signals on the system. The number of users that can simultaneously use system 100 is a function of the number of unique speckle patterns that can be detected and processed by processor 180, which in turn is a function of the number of control pixels 155 in transmit aperture 150 and the number of photodetector pixels 175 in receive aperture 170.

Accurate detection of user identification speckle patterns is critical to efficient and effective operation of communications system 100 and thus it is critical that transmit aperture 150 and receive aperture 170 be spatially synchronized. As used herein, "spatially synchronized" and the like refer to identifying and maintaining the relationship between a reference point for the speckle pattern (or mask) transmitted from the transmit aperture and the corresponding reference point in the pixel array of receive aperture 170. The reference point can be any predetermined location in the transmitted speckle pattern, such as the center of the pattern, a corner, or the like. At transmit aperture 150 the mask reference point corresponds to the analogous physical position in the array of control pixels 155 (e.g., center, corner, etc.). At receive aperture 170, however, due to physical misalignments over distance D (such as might result from use of the beam coupling optics 160 to accomodate multiple transmit apertures), the reference point of the transmitted speckle pattern may not be precisely aligned with the analogous physical location in the array of photodetectors 175. It is thus necessary to determine the position of the mask reference point with respect to the receive array reference point so that signals generated by the receive pixels can be accurately interpreted. Proper spatial synchronization (or alignment) becomes increasingly important as the number of independent pixels in transmit aperture 150 increases.

In accordance with this invention a method for spatially synchronizing the transmit and receive aperture in an optical communications system comprises transmitting a pyramidal synchronizing profile so as to register a user's speckle pattern at the receive aperture. As used herein, "pyramidal synchronizing profile" or the like refers to an iterative sequence of increasingly refined speckle patterns that conclude with a particular predetermined speckle pattern, typically the respective user's unique identification speckle pattern. Registration of the user's speckle pattern at the receive aperture refers to the spatial synchronization of the transmit and receive aperture through identification of the position of the reference point of the transmitted speckle pattern with respect to a known reference point on receive aperture 170 so that signals generated by receive pixels 175 in aperture 170 are processed to accurately represent the transmitted speckle pattern.

Transmitting a pyramidal synchronizing profile include transmitting a user initialization iteration signal, transmitting at least one intermediate iteration signal, and transmitting a final iteration signal that comprises the user identification speckle pattern. The user initialization signal comprises a simple speckle pattern that is readily recognized by transmit aperture 170. By way of example and not limitation, the user initialization signal typically is a spot or a uniform level of illumination at the receive aperture. To generate such a simple signal typically all control pixels 155 of the user's transmit aperture are set to the same setting, such as zero phase shift. The typical pyramidal synchronization profile comprises multiple intermediate iteration signals, each subsequent sequential signal providing more refined speckle patterns building towards the user's unique identification speckle pattern. Such intermediate speckle patterns are readily generated by electronically subdividing control pixels 155 in transmit aperture 150 into progressively smaller regions with common settings for each control pixel in respective regions so that progressively more detailed speckle patterns are generated. Due to the iterative nature of the process, a relatively simple processor 180 can quickly correlate the signals and determine with increasing accuracy the reference point of the user's transmitted speckle pattern with respect to a known reference point in the receive aperture.

Figure 2:
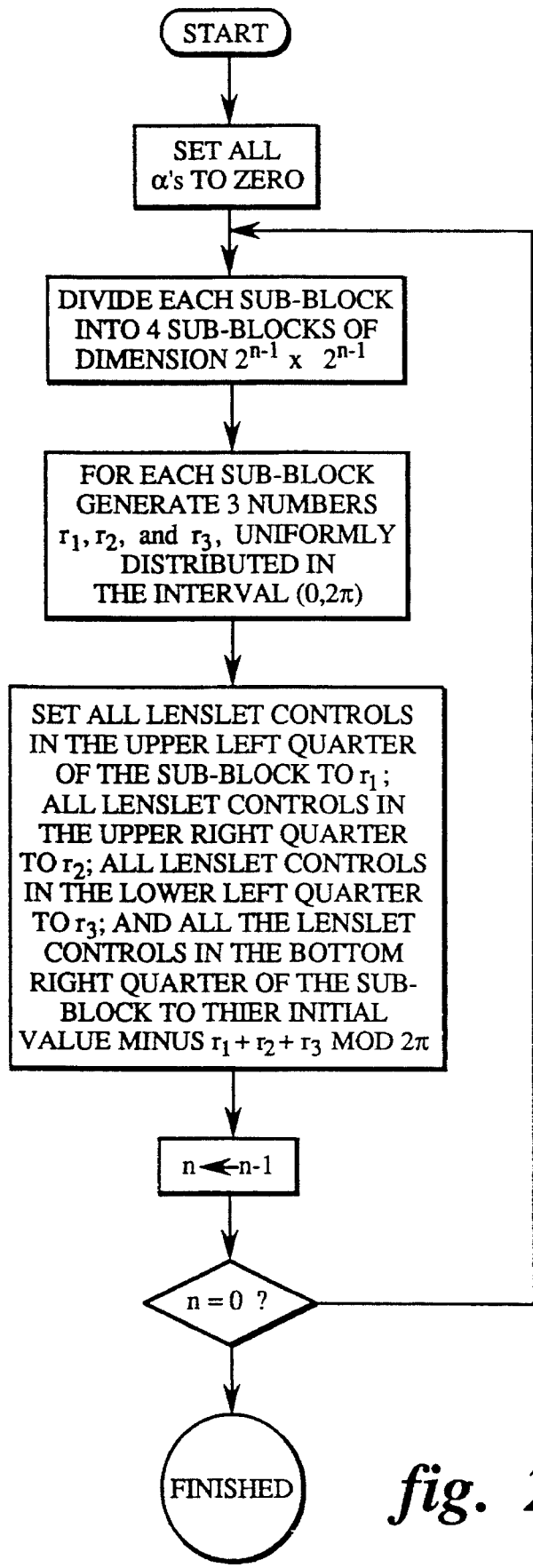
FIG. 2 is a block diagram illustrating the steps in determining a pyramidal speckle pattern profile.

The sequential steps in the pyramidal synchronization profile constitute a "speckle pattern tree" that is unique to a particular user of communications system 100. One method of developing a user pyramidal synchronizing profile having n iterative steps for an array of $2^n \times 2^n$ control pixels is shown in box diagram format in FIG. 2 and includes the following steps:

a) Initially set all control pixel settings to a common value for the first block of control pixel settings to generate the initialization iteration signal; typically, this task is accomplished by setting all control pixels in the transmit aperture to zero;

b) Next, starting with the first of the n iterative steps, divide each existing block (that is, the respective block(s) of control pixels currently being controlled at the inception of this step) of control pixel settings into respective first through fourth sub-blocks, each of the newly-created sub-blocks having a dimension of $2^{n-1} \times 2^{n-1}$;

c) For each sub-block determined in step (b), generate numbers $r_1$, $r_2$, and $r_3$, said numbers being uniformly distributed in the interval $[0, 2\pi]$;

d) Set control pixel control settings in respective sub-blocks (determined in the latest iteration of step (b)) as follows:
control pixel settings in the first sub-block have a value of $r_1$;
control pixel settings in the second sub-block have a value of $r_2$;
control pixel settings in the third sub-block have a value of $r_3$;
control pixel settings in the fourth sub-block have a value of their initial value (as determined in the previous iterative step) minus $(r_1+r_2+r_3)$ mod $2\pi$;

e) For the next iteration, the value of "n" becomes "n-1"; if n is not equal to zero, repeat steps (b) through (d); if n=0, then the pyramidal synchronizing profile is complete.

For each iteration in which a speckle pattern is transmitted, receive aperture 170 generates a signal corresponding to the received speckle pattern, which signal is correlated in processor 180 with a library containing the respective speckle pattern trees of users of communication system 100. The library (e.g., data base electronically accessible by the processor) comprises the successive iterations of the respective pyramidal synchronizing profiles of each of the system users. Correlation of the received speckle pattern at each successive iteration with the library of known speckle patterns enables the processor to rapidly exclude user speckle pattern trees that do not correspond to the received pattern, thus at each iteration the processor must search an ever smaller field of potential correct user speckle pattern trees, thereby increasing the speed with which the processor can process the increasingly complex received speckle patterns and match and register the user's identification speckle pattern.

After matching the user's identification speckle pattern, processor 180 is further able to compute the spatial position of the reference point in the user's transmitted speckle pattern with respect to a corresponding reference point in the array of photodetectors comprising receive aperture 170. For example, if the reference point to be used is the geometric center of the speckle pattern (and thus the corresponding reference point in receive aperture 170 is the geometric center of the array of receive pixels 175), transmitting the pyramidal synchronization profile results in the determination of an offset value that relates the position of the geometric center of the transmitted speckle pattern to the geometric center of the receive aperture array. This offset value is then used to electronically shift the center of receive aperture array for purposes of processing the speckle patterns transmitted by that respective user. Examples of how the reference point of the receive aperture array are electronically shifted include, for example, electronically representing the reference as a grid value and determining an increment or decrement to interpolate grid values as appropriate.

Following the initial spatial synchronization of a particular user's speckle pattern (or mask), that user is then ready to transmit traffic through optical communications system 100. Maintenance of spatial synchronization throughout the communications session is typically maintained by processor 180 with control loops that dither the mask's position over a fractional pixel displacement and track the aberrations, making adjustments as necessary to minimize such aberrations.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A spatial synchronization method for an optical communication system having a transmit aperture comprising a plurality of control pixels for signal transmission and a receive aperture comprising a plurality of receive pixels, each user of said communication system having a unique respective identification speckle pattern, the synchronization method comprising:
transmitting a user pyramidal synchronizing profile so as to sequentially spatially register said identification speckle pattern at said receive aperture, the step of transmitting a pyramidal synchronizing speckle pattern comprising:
transmitting a user initialization iteration signal in which the transmit aperture control pixels are set to generate a known initialization speckle pattern;
transmitting at least one user intermediate iteration signal in which a portion of said transmit aperture control pixels are set to generate a known intermediate speckle pattern,
transmitting a user final iteration signal in which said transmit aperture control pixels are set to generate said identification speckle pattern.

2. The method of claim 1 wherein the step of transmitting said user initialization iteration signal comprises setting each of said transmit aperture control pixels to a common setting.

3. The method of claim 1 wherein the step of transmitting said at least one user intermediate iteration signal comprises sequentially transmitting a plurality of intermediate iteration signals, each of said user intermediate iteration signals corresponding to an increment on a pyramidal user speckle pattern tree terminating in said user identification speckle pattern.

4. The method of claim 3 wherein transmit aperture comprises an array of $2^n \times 2^n$ control pixels.

5. The method of claim 4 wherein said user speckle pattern tree comprises a plurality of respective blocks of transmit aperture control pixel settings determined in accordance with the following relationship:

a) set all pixel control settings to zero for first block of control pixel settings;

b) divide the existing block of control pixel settings (at the inception of step (b)) into respective first through fourth sub-blocks of dimension $2^{n-1} \times 2^{n-1}$;

c) for each sub-block of step (b), generate numbers $r_1$, $r_2$, and $r_3$, said numbers being uniformly distributed in the interval $[0, 2\pi]$;

d) set respective pixel control settings as follows:
   pixel control settings in the first sub-block have a value of $r_1$;
   pixel control settings in the second sub-block have a value of $r_2$;
   pixel control settings in the third sub-block have a value of $r_3$;
   pixel control settings in the fourth sub-block have a value of initial value minus $(r_1+r_2+r_3)$ mod $2\pi$;

e) for the next iteration, the value of n becomes (n−1); if value of next iteration n is not zero, repeat steps (b) through (d); if value of n for next iteration is zero, then speckle pattern tree is complete.

6. The method of claim 5 wherein each of said respective control pixel settings determines the phase shift imparted to light passing through respective pixels.

7. The method of claim 1 further comprising the step of spatially aligning said receive aperture with said transmit aperture for each respective user accessing said optical communications system.

8. The method of claim 7 wherein the step of spatially aligning said receive aperture comprises processing said pyramidal synchronizing profile detected at said receive aperture and correlating the received pyramidal synchronizing profile with a library of respective user pyramidal synchronizing profiles.

9. The method of claim 8 wherein the step of processing said pyramidal synchronizing profile detected at said receive aperture comprises the steps of collecting light emanating from said transmit aperture that is incident on said receive aperture pixels for a dwell time and converting the spatial pattern of the collected light during said dwell time to corresponding respective electrical signals.

10. The method of claim 8 wherein the step of spatially aligning said receive aperture further comprises determining a user speckle array offset signal relating a speckle pattern reference point with respect to a receive pixel array reference point.

11. The method of claim 10 wherein the step of spatially aligning said receive aperture further comprises applying said user speckle pattern offset signal to a receive pattern processor so as to spatially align the user's transmitted speckle pattern with said receive aperture.

12. The method of claim 11 further comprising the step of dithering said user speckle pattern offset signal with respect to said user speckle pattern reference point so as to maintain spatial alignment of said receive aperture with respect to the respective transmitted user speckle pattern.

* * * * *